(12) United States Patent
Okamoto

(10) Patent No.: US 11,431,893 B2
(45) Date of Patent: Aug. 30, 2022

(54) IMAGING APPARATUS

(71) Applicant: Panasonic Intellectual Property Management Co., Ltd., Osaka (JP)

(72) Inventor: Mitsuyoshi Okamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/262,875

(22) PCT Filed: Sep. 20, 2019

(86) PCT No.: PCT/JP2019/037017
§ 371 (c)(1),
(2) Date: Jan. 25, 2021

(87) PCT Pub. No.: WO2020/080037
PCT Pub. Date: Apr. 23, 2020

(65) Prior Publication Data
US 2021/0321034 A1 Oct. 14, 2021

(30) Foreign Application Priority Data
Oct. 18, 2018 (JP) .............................. JP2018-196724

(51) Int. Cl.
*H04N 5/232* (2006.01)
*G06V 40/10* (2022.01)
(Continued)

(52) U.S. Cl.
CPC ......... *H04N 5/23219* (2013.01); *G06V 40/10* (2022.01); *H04N 5/23216* (2013.01);
(Continued)

(58) Field of Classification Search
CPC ......... H04N 5/23219; H04N 5/232945; H04N 5/23216; H04N 5/23245; H04N 5/232127;
(Continued)

(56) References Cited

U.S. PATENT DOCUMENTS 8,374,435 B2 * 2/2013 Kurahashi .............. G06V 40/16
382/190
8,400,521 B2 * 3/2013 Okamoto ......... H04N 5/232945
348/222.1
(Continued)

FOREIGN PATENT DOCUMENTS

JP 2009212557 A 9/2009
JP 2011095862 A 5/2011
(Continued)

OTHER PUBLICATIONS

Office Action for corresponding Japanese Application No. 2020-521615 dated Oct. 26, 2021 and its English Machine Translation.
(Continued)

*Primary Examiner* — Pritham D Prabhakher
(74) *Attorney, Agent, or Firm* — Renner, Otto, Boisselle & Sklar, LLP

(57) ABSTRACT

An imaging apparatus includes: an image sensor that captures an image of an object to generate a captured image; a display that displays the captured image; a first detector that detects, when the object is a human, at least a portion of the human; a second detector that detects, when the object is an animal, at least a portion of the animal; and a controller that controls the display to display a first detection frame and a second detection frame on the captured image, the first detection frame corresponding to the human and the second detection frame corresponding to the animal, wherein the controller controls the display to display the first and second detection frames in a common displaying style when neither
(Continued)

the first detection frame nor the second detection frame is a third detection frame corresponding to a main object of the objects.

14 Claims, 11 Drawing Sheets

(51) Int. Cl.
*G06V 40/19* (2022.01)
*G06V 40/16* (2022.01)

(52) U.S. Cl.
CPC ... *H04N 5/23245* (2013.01); *H04N 5/232127* (2018.08); *H04N 5/232945* (2018.08); *G06V 40/161* (2022.01); *G06V 40/19* (2022.01)

(58) Field of Classification Search
CPC ......... H04N 5/232933; H04N 5/23218; H04N 5/232; H04N 5/23222; H04N 5/23212; H04N 5/232939; H04N 5/23293; H04N 2101/00; H04N 13/02; H04N 13/20; G06K 9/00362; G06K 9/00604; G06K 9/00228; G06V 40/10; G06V 40/19; G06V 40/161; G06V 40/166; G06V 10/255; G06V 10/62; G06V 20/10; G03B 15/00; G03B 13/36; G03B 17/18; G03B 35/08; G02B 7/28; G02B 7/36; G06T 7/74; G06F 16/583; G06F 16/51; G06F 16/5838
USPC ..................................................... 348/333.03
See application file for complete search history.

(56) References Cited

U.S. PATENT DOCUMENTS

| 8,577,098 | B2* | 11/2013 | Ito | G06F 16/5838 |
| | | | | 382/118 |
| 8,643,740 | B2* | 2/2014 | Fukata | H04N 5/23219 |
| | | | | 348/222.1 |
| 8,823,864 | B2* | 9/2014 | Suzuki | H04N 5/232945 |
| | | | | 348/346 |
| 8,947,553 | B2* | 2/2015 | Fukata | G06V 10/255 |
| | | | | 348/222.1 |
| 9,311,712 | B2* | 4/2016 | Fukata | G06V 10/255 |
| 10,212,353 | B2* | 2/2019 | Uemura | H04N 5/23293 |
| 10,225,462 | B2* | 3/2019 | Murakami | H04N 5/23219 |
| 2006/0012702 | A1* | 1/2006 | Kawahara | H04N 5/23218 |
| | | | | 348/E5.045 |
| 2009/0002516 | A1* | 1/2009 | Suzuki | H04N 5/232945 |
| | | | | 348/223.1 |
| 2010/0119155 | A1* | 5/2010 | Kurahashi | G06F 16/50 |
| | | | | 382/190 |
| 2011/0096995 | A1 | 4/2011 | Ito | |
| 2011/0273578 | A1 | 11/2011 | Okamoto | |
| 2012/0002067 | A1 | 1/2012 | Fukata | |
| 2012/0314074 | A1* | 12/2012 | Aimura | G06V 20/58 |
| | | | | 348/148 |
| 2013/0069978 | A1 | 3/2013 | Tanaka | |
| 2013/0155308 | A1* | 6/2013 | Wu | H04N 5/23219 |
| | | | | 348/333.05 |
| 2014/0029799 | A1* | 1/2014 | Fukata | G06T 7/74 |
| | | | | 382/103 |
| 2014/0247374 | A1* | 9/2014 | Murakami | H04N 5/232945 |
| | | | | 348/222.1 |
| 2015/0070526 | A1* | 3/2015 | Kinoshita | H04N 5/23216 |
| | | | | 348/222.1 |
| 2015/0085139 | A1* | 3/2015 | Fukata | G06V 10/235 |
| | | | | 348/169 |
| 2018/0106982 | A1 | 4/2018 | Uemura | |

FOREIGN PATENT DOCUMENTS

| JP | 2011-239120 A | 11/2011 |
| JP | 2012-015889 A | 1/2012 |
| JP | 2012-037556 A | 2/2012 |
| JP | 2013-065110 A | 4/2013 |
| JP | 2014204249 A | 10/2014 |
| JP | 2018-067787 A | 4/2018 |

OTHER PUBLICATIONS

English translation of the International Preliminary Report on Patentability Corresponding Application No. PCT/JP2019/037017 dated Apr. 29, 2021.
International Search Report for corresponding Application No. PCT/JP2019/037017, dated Dec. 3, 2019.
Japanese Office Action corresponding application No. 2020-521615 dated Mar. 9, 2021, with machine translation.

* cited by examiner

IMAGING APPARATUS

TECHNICAL FIELD

The present disclosure relates to an imaging apparatus having a function of detecting a human and an animal.

BACKGROUND ART

Patent Document 1 discloses an electronic camera performing a pet imaging task such as an AF process focusing on a face image of an animal. When a pet imaging mode is selected, the electronic camera of Patent Document 1 performs a person-face detecting task in parallel with a pet imaging task, and performs a pet-face detecting task after completion of the person-face detecting task. When a face image of a person is found in the person-face detecting task, a face-frame-structure character surrounding the face image of the person is displayed on an LCD monitor of the electronic camera, and the subsequent pet-face detecting task is performed with reference to a portion of an animal-face dictionary corresponding to the face image of the person. As a result, an object is achieved in terms of shortening a time required for searching for an animal face image and improving an imaging performance.

CITATION LIST

Patent Document

Patent Document 1: JP 2011-239120 A

SUMMARY

The present disclosure provides an imaging apparatus detecting a human and an animal and capable of reducing a possibility of making a user uncomfortable.

An imaging apparatus according to the present disclosure includes an image sensor, a display, a first detector, a second detector, and a controller. The image sensor captures an image of an object to generate a captured image. The display displays the captured image. The first detector detects at least a portion of a human when the object is the human. The second detector detects at least a portion of an animal when the object is the animal. The controller controls the display to display a first detection frame corresponding to the human and a second detection frame corresponding to the animal on the captured image. The controller controls the display to display the first and second detection frames in a common displaying style when neither the first detection frame nor the second detection frame is a third target detection frame corresponding to a main object of the objects.

According to the imaging apparatus of the present disclosure, the first detection frame corresponding to the human other than the main object and the second detection frame corresponding to the animal are displayed without distinction from each other, so that the possibility of making a user uncomfortable can be reduced in the imaging apparatus detecting a human and an animal.

DESCRIPTION OF EMBODIMENTS

Embodiments will be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art. The accompanying drawings and the following description are provided by the present inventor(s) for sufficient understanding of the present disclosure by those skilled in the art, and it is not intended to limit the subject matter described in claims thereto.

First Embodiment

In a first embodiment, a digital camera having a function of detecting a human and an animal based on an image recognition technique will be described as an example of an imaging apparatus according to the present disclosure. Such a detection function might cause a situation where a user feels uncomfortable when a human is erroneously detected as an animal. Therefore, this embodiment provides a digital camera capable of reducing the possibility of making a user uncomfortable due to erroneous detection in the detection function.

[1-1. Configuration]

A configuration of a digital camera according to the first embodiment will be described with reference to FIG. 1.

Figure 1:
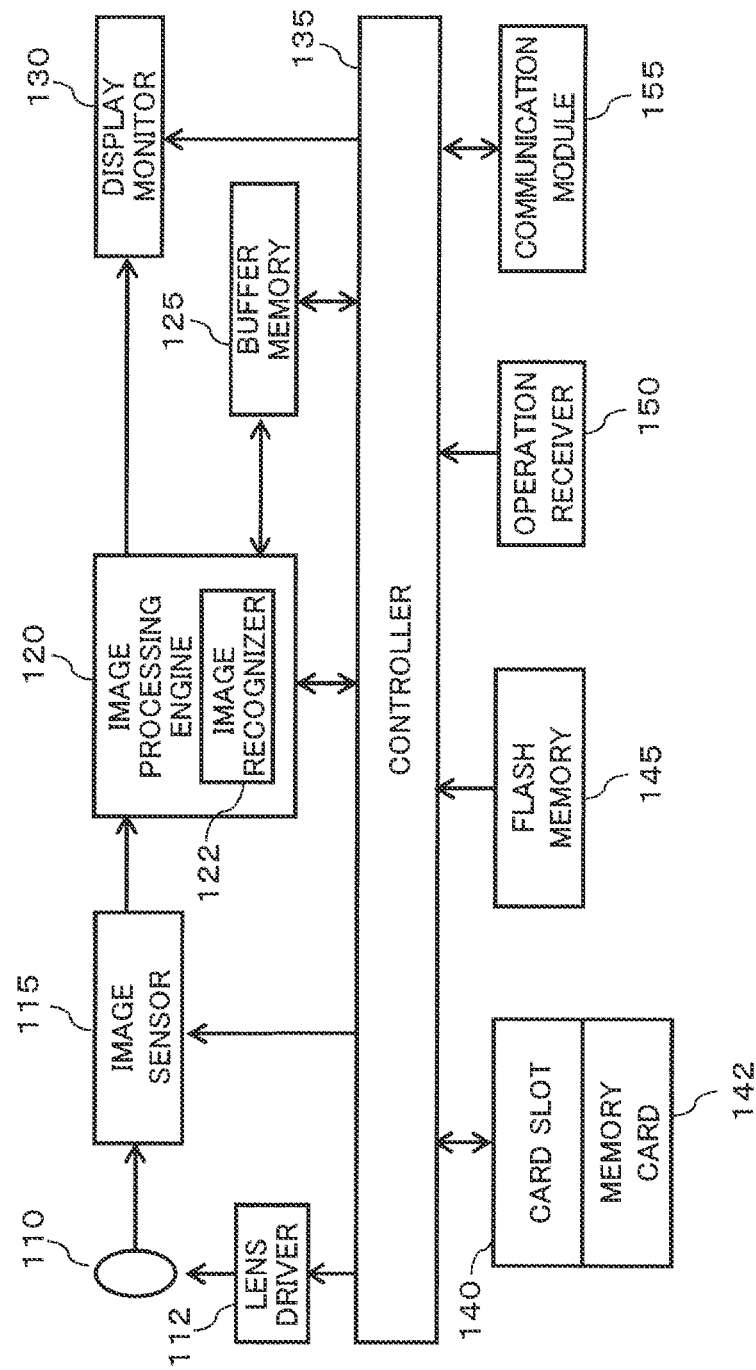
FIG. 1 is a diagram showing a configuration of a digital camera according to a first embodiment of the present disclosure.

FIG. 1 is a diagram showing a configuration of a digital camera 100 according to this embodiment. The digital camera 100 of this embodiment includes an image sensor 115, an image processing engine 120, a display monitor 130, and a controller 135. The digital camera 100 further includes a buffer memory 125, a card slot 140, a flash memory 145, an operation receiver 150, and a communication module 155. The digital camera 100 also includes, for example, an optical system 110 and a lens driver 112.

The optical system 110 includes a focus lens, zoom lens, an optical image stabilization (OIS) lens, a diaphragm, a shutter, and the like. The focus lens is a lens for changing a focus state of an object image formed on the image sensor 115. The zoom lens is a lens for changing a magnification of an object image formed by the optical system. The focus lens and the like are each made up of one or more lenses.

The lens driver 112 drives the focus lens and the like in the optical system 110. The lens driver 112 includes a motor and moves the focus lens along an optical axis of the optical system 110 based on control of the controller 135. A configuration for driving the focus lens in the lens driver 112 can be implemented by a DC motor, a stepping motor, a servo motor, an ultrasonic motor or the like.

The image sensor 115 captures an object image formed via the optical system 110 to generate imaging data. The imaging data is image data representative of an image captured by the image sensor 115. The image sensor 115 generates image data for new frames at a predetermined frame rate (e.g., 30 frames/second). The timing of generation of the imaging data and an electronic shutter operation in the image sensor 115 are controlled by the controller 135. The image sensor 115 can be implemented by using various image sensors such as a CMOS image sensor, a CCD image sensor, and an NMOS image sensor.

The image sensor 115 performs a still image capturing operation, a through image capturing operation, or the like. The through image is mainly a moving image and is displayed on the display monitor 130 for the user determining a composition for capturing a still image. Both the through image and the still image are examples of a captured image in this embodiment. The image sensor 115 is an example of an image sensor in this embodiment.

The image processing engine 120 performs various processes for the imaging data output from the image sensor 115 to generate image data, and performs various processes for the image data to generate an image to be displayed on the display monitor 130. The various processes include, but not limited to, white balance correction, gamma correction, a YC conversion process, an electronic zoom process, compression process, a decompression process, and the like. The image processing engine 120 may be made up of a hard-wired electronic circuit or may be made up of a microcomputer or a processor using a program.

In this embodiment, the image processing engine 120 includes an image recognizer 122 implementing a function of detecting a human and an animal through image recognition of a captured image. The details of the image recognizer 122 will be described later.

The display monitor 130 is an example of display displaying various information. For example, the display monitor 130 displays an image (through image) shown by image data captured with the image sensor 115 and processed by the image processing engine 120. The display monitor 130 displays a menu screen or the like for the user performing various settings for the digital camera 100. The display monitor 130 can be made up of a liquid crystal display device or an organic EL device, for example. The display is not limited to the display monitor 130 and may be an EVF (electronic viewfinder), for example.

The operation receiver 150 is a general term for hard keys such as operation buttons and operation levers disposed on an exterior of the digital camera 100, and receives an operation performed by a user. For example, the operation receiver 150 includes a release button, a mode dial, and a touch panel. When receiving an operation performed by the user, the operation receiver 150 transmits an operation signal corresponding to the user operation to the controller 135.

The controller 135 entirely controls an overall operation of the digital camera 100. The controller 135 includes a CPU or the like, and the CPU executes a program (software) to implement a predetermined function. The controller 135 may include, instead of the CPU, a processor made up of a dedicated electronic circuit designed to implement a predetermined function. Therefore, the controller 135 can be implemented by various processors such as CPU, MPU, CPU, DSU, FPGA, and ASIC. The controller 15 may be made up of one or more processors. The controller 135 may be made up of one semiconductor chip together with the image processing engine 120 and the like.

The buffer memory 125 is a recording medium functioning as a work memory of the image processing engine 120 and the controller 135. The buffer memory 125 is implemented by a DRAM (Dynamic Random Access Memory) or the like. The flash memory 145 is a nonvolatile recording medium. Although not shown, the controller 135 may have various internal memories and may include a built-in ROM, for example. Various programs executed by the controller 1355 are stored in the ROM. The controller 135 may include a built-in RAM functioning as a work area of the CPU.

The card slot 140 is means into which a removable memory card 142 is inserted. The card slot 140 can electrically and mechanically connect the memory card 142. The memory card 142 is an external memory having a recording element such as a flash memory disposed therein. The memory card 142 can store data such as image data generated by the image processing engine 120.

The communication module 155 is a communication module (circuit) performing communications compliant with the communication standard IEEE 802.11 or a Wi-Fi standard or the like. The digital camera 100 can communicate with another device via the communication module 155. Through the communication module 155, the digital camera 100 may communicate directly with another device or may communicate via an access point. The communication module 155 may be connectable to a communication network such as the Internet.

[1-1-1. Image Recognizer]

Details of the image recognizer 122 in this embodiment will be described with reference to FIG. 2.

Figure 2:
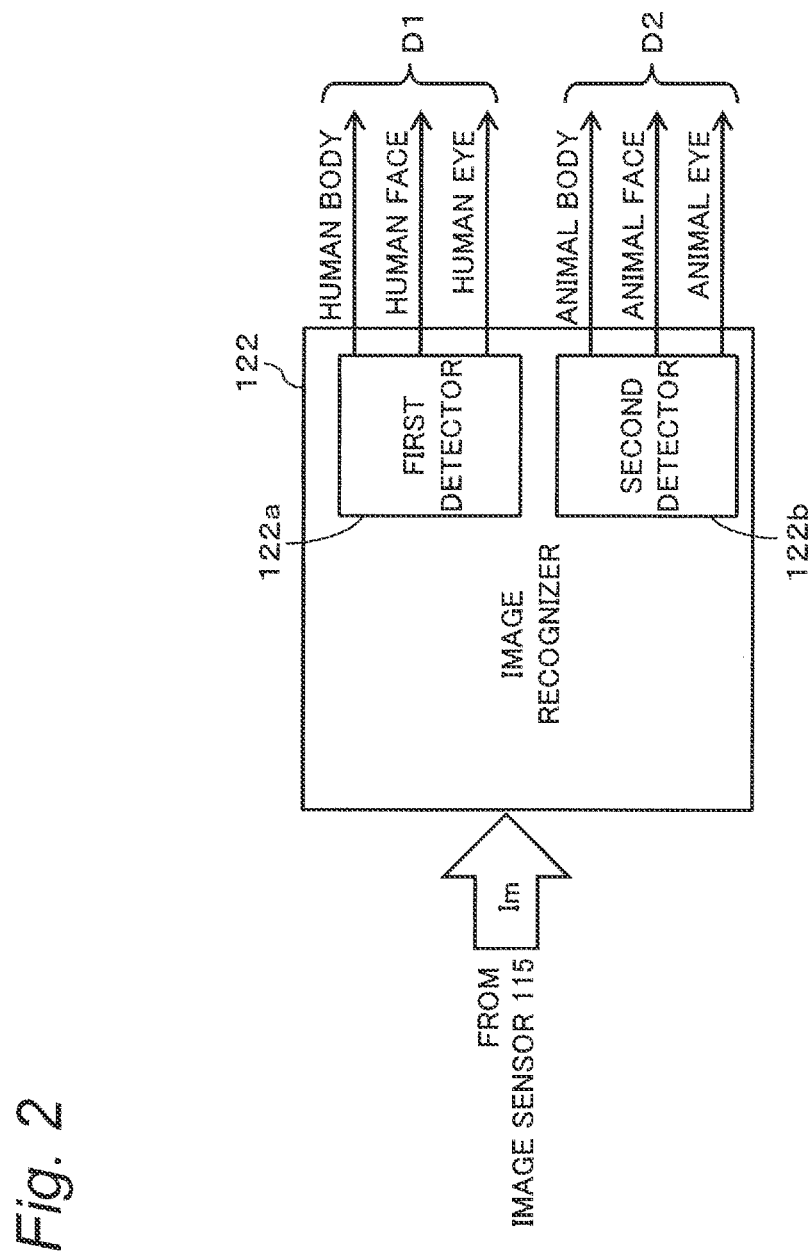
FIG. 2 is a diagram for explaining an image recognizer in the digital camera.

FIG. 2 is a diagram for explaining the image recognizer 122 in the digital camera 100. The image recognizer 122 employs a learned model based on a neural network such as a convolutional neural network, for example. The image recognizer 122 inputs information indicative of a captured image Tri of the image sensor 115 to the learned model, and performs an image recognition process using the model. The image recognizer 122 functions as a first detector 122a outputting human detection information D1 indicative of a detection result of a human and an animal from the image recognition process, and a second detector 122b outputting animal detection information D2. The image recognizer 122 is an example of first and second detectors in this embodiment.

For example, the image recognition process of the image recognizer generates the detection information D1, D2 by outputting position information, which indicates a region showing an object classified into any one of multiple preset categories in the image Im input to the learned model, in correlation with each category. For example, the multiple categories include parts of a human such as a body, a face, and an eye of a human, and parts of an animal such as a body, a face, and an eye of an animal. The human detection information includes position information corresponding to detection results of parts of a human, and the animal detection information includes position information corresponding to detection results of parts of an animal. The position information is defined, for example, by a horizontal position and a vertical position on the image Im to be processed, and indicates, for example, a region surrounding each detected part in a rectangular shape (see FIGS. 3A and 3B).

The image recognizer 122 can simultaneously detect objects up to a preset maximum number of pieces for each category. The animal category may further be classified by a type of animal. For example, categories such as dogs, cats, and birds may separately be set, or dogs and cats may be classified into one category together.

The learned model of the image recognizer 122 as described above can be obtained by supervised learning using, as training data, image data in which a ground truth label indicating an image of an object in each category as a ground truth is associated with position information of the object in the image, for example. The learned model may generate a reliability or likelihood for a detection result of each category. The first detector 122a and the second detector 122b may apply a partially or completely common learned model or may apply different learned models.

The learned model of the image recognizer 122 is not limited to a neural network and may be a machine learning model related to various types of image recognition. The image recognizer 122 is not limited to machine learning and may employ various image recognition algorithms. For example, the image recognizer 122 may be configured such that detection for some categories such as a face and an eye of a human is performed by a rule-based image recognition process. The image recognizer 122 may be made up of a DSP, for example. The image recognizer 122 may be configured separately from the image processing engine 120 or may be configured integrally with the controller 135.

[1-2. Operation]

The operation of the digital camera 100 configured as described above will hereinafter be described.

The digital camera 100 captures an object image formed via the optical system 110 with the image sensor 115 to generate imaging data. The image processing engine 120 performs various processes for the imaging data generated by the image sensor 115 to generate image data. The controller 135 records the image data generated by the image processing engine 120 on the memory card 142 attached to the card slot 140, for example, in a still image capturing operation.

The digital camera 100 displays a through image on the display monitor 130 in a through image capturing operation. The user can check a composition for capturing a still image with the through image on the display monitor 130. The controller 135 performs a focusing operation for controlling the lens driver 112 to drive the focus lens of the optical system 110 in accordance with a user's release button operation, for example.

At the time of the image capturing operation as described above, the digital camera 100 of this embodiment performs image recognition on the captured image Im such as a through image to detect a human and an animal so as to identify a main object to be focused, for example. An overview of the operation of the digital camera 100 according to this embodiment will be described with reference to FIGS. 3A and 3B.

Figure 3A:
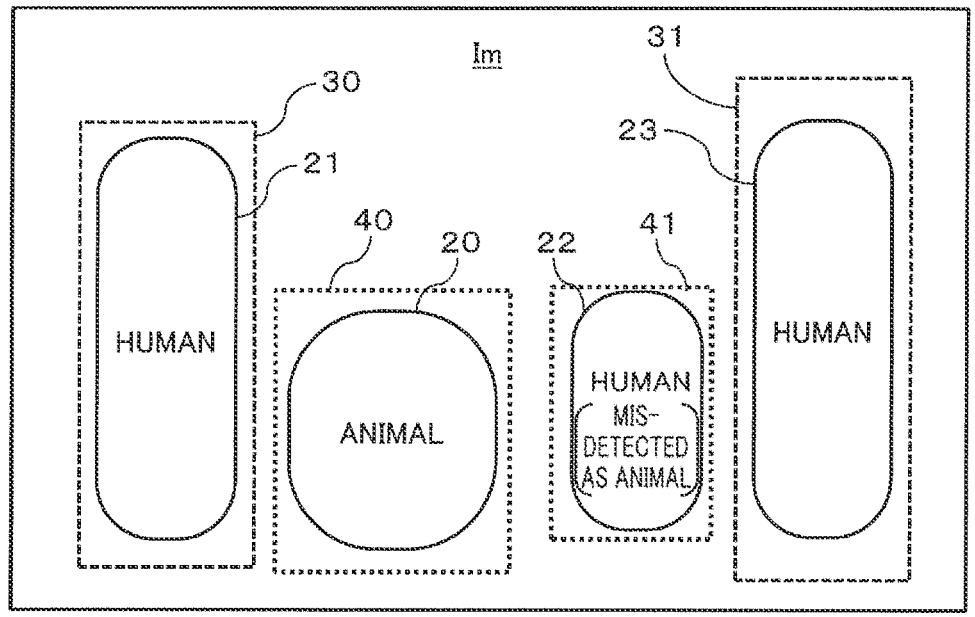
FIGS. 3A and 3B are diagrams for explaining an overview of an operation of the digital camera.
Figure 3B:
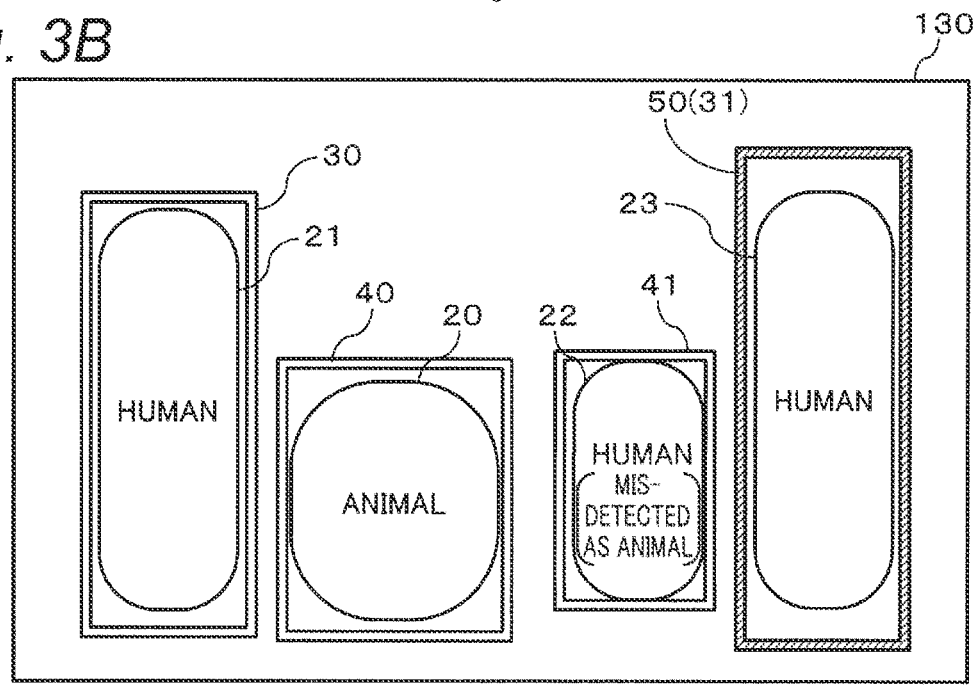

FIG. 3A shows an example of a state in which persons 21 to 23 and an animal 20 are detected as objects of the digital camera 100. FIG. 3B shows a display example of the display monitor 130 in the example of FIG. 3A.

The digital camera 100 of this embodiment recognizes a human detection frame 30 and an animal detection frame 40 by the image recognition process of the image recognizer 122 on the captured image Im of the image sensor 115, and displays the detection frames 30, 40 on the through image of the display monitor 130. The human detection frame 30 indicates a region on the image corresponding to each part of the person detected in the human detection information D1 in the detection result of the image recognizer 122. The animal detection frame 40 indicates a region on the image corresponding to each part of the animal detected in the animal detection information D2. In this embodiment, the human detection frame 30 is an example of a first detection frame, and the animal detection frame 40 is an example of a second detection frame.

FIG. 3A illustrates a state in which human detection frames 30, 31 and animal detection frames 40, 41 are recognized in the captured image Im showing the persons 21 to 23 and the animal 20. The detection frames 30, 31, 40, 41 surround the regions of the respective corresponding objects 21, 23, 20, 22 in a rectangular shape, for example. The human detection frames 30, 31 and the animal detection frames 40, 41 are not particularly limited to a rectangular shape and may be set to various shapes such as various polygonal shapes, circular shapes, or elliptical shapes.

With the detection frames 30 to 41 displayed, the user can understand the objects 20 to 23 recognized by the digital camera 100 and uses each of the detection frames 30 to 41 to specify a main object defined as a target of autofocus (AF) out of the recognized objects 20 to 23. For example, the main object in the example of FIGS. 3A and 3B is the person 23 on the right side in the figure, and the corresponding human detection frame 31 is displayed as an AF target detection frame 50. The AF target detection frame 50 is an example of a third detection frame in this embodiment.

FIG. 3A shows an example in which the person 22 different from the main object is erroneously detected as an animal. Due to such erroneous detection, the animal detection frame 41 surrounds the person 22. In such a case, if the human detection frames 30, 31 and the animal detection frames 40, 41 were displayed as being distinguished as it is, the user would visually recognize the erroneous detection in which the person 22 is mistaken for an animal, and the user would feel uncomfortable.

To solve this, the digital camera 100 of this embodiment uses a displaying style in which a detection result of a human and a detection result of an animal are not distinguished from each other when the detection frames 30 to 41 are displayed on the dis monitor 130. For example, in the display example of FIG. 3B, the human detection frame 30 and the animal detection frames 40, 41 other than the AF target detection frame 50 have the same color, line type, line width, and frame shape. Therefore, the animal detection frame 41 due to the erroneous detection of the person 22 is displayed in the same manner as the human detection frame 30. This can prevent the user from viewing erroneous detection in which the person 22 is mistaken, so as to avoid making the user uncomfortable.

[1-2-1. Mode Setting]

The digital camera 100 of this embodiment is configured such that the camera can be set to a human/animal detection mode for detecting a human and an animal as described above and a human detection mode for detecting a human without detecting an animal, but cannot be set to an operation mode for detecting an animal without detecting a human (hereinafter, referred to as an "animal detection mode"). Mode setting in the digital camera 100 of this embodiment will be described with reference to FIGS. 4A to 5.

Figure 4A:
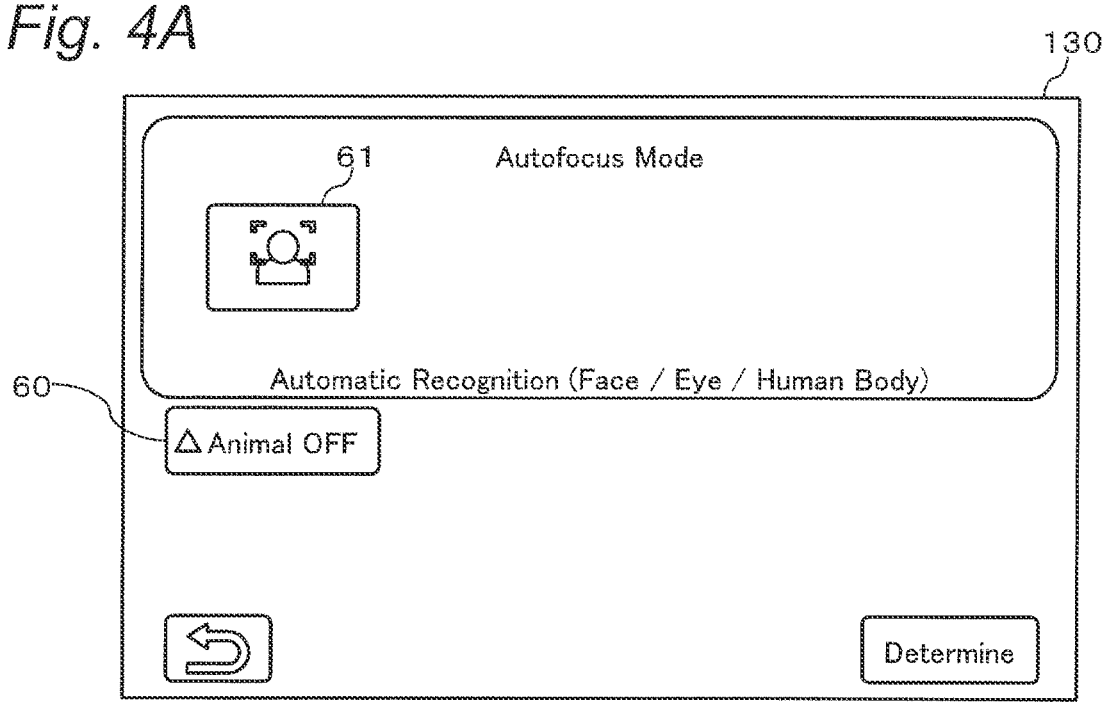
FIGS. 4A and 4B show display examples of a mode setting screen of the digital camera.
Figure 4B:
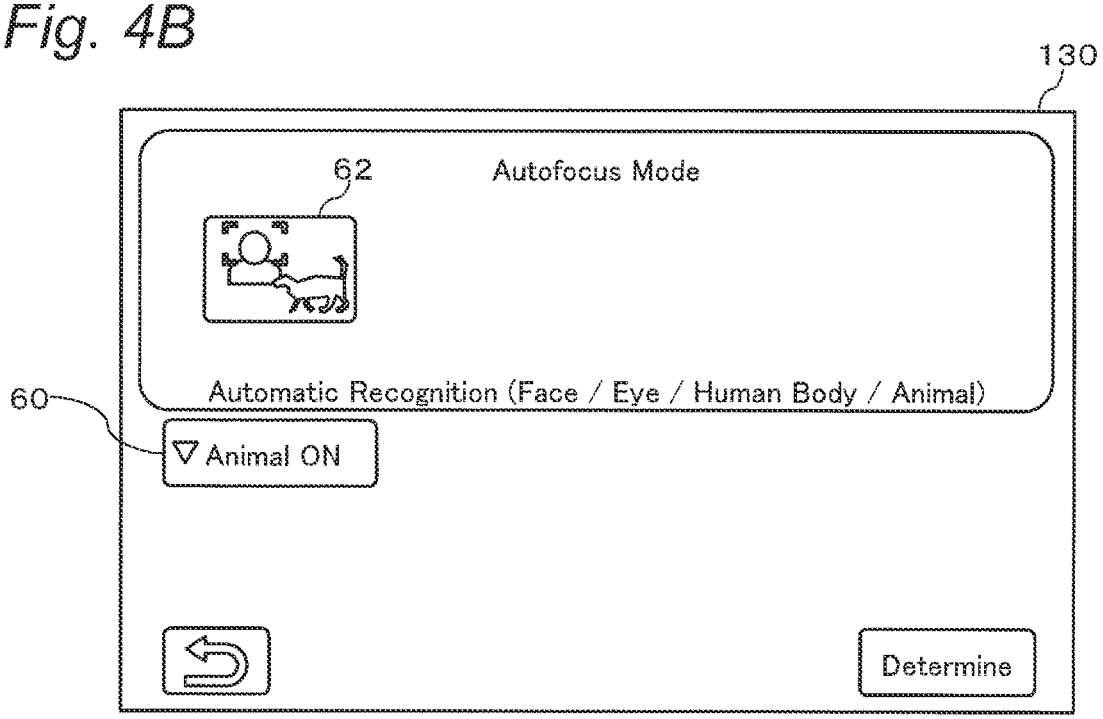
Figure 5:
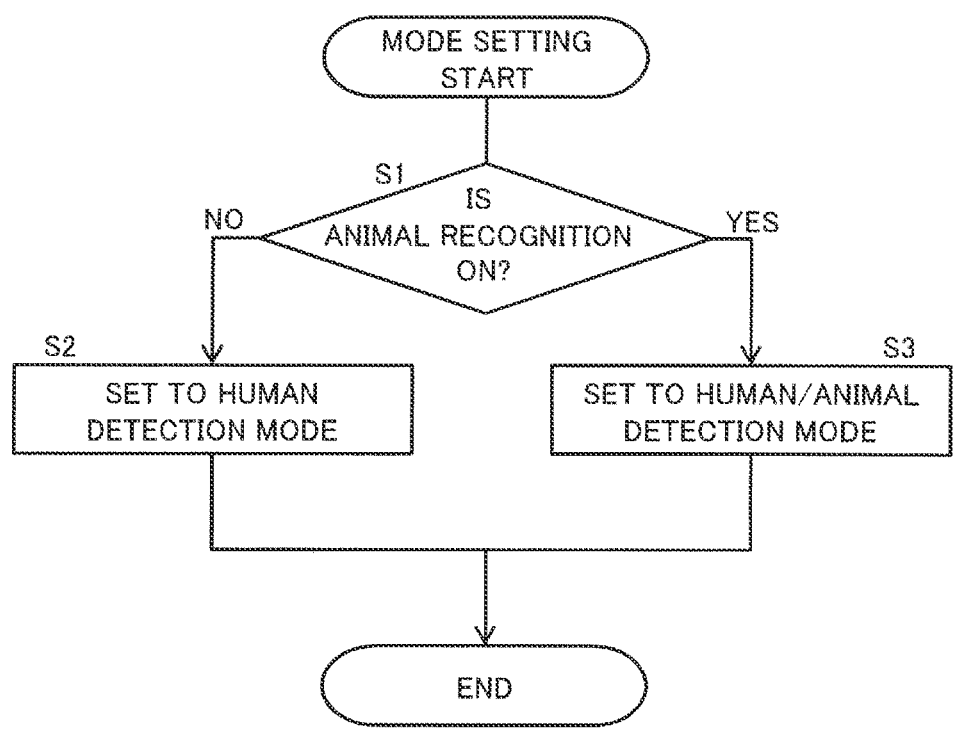
FIG. 5 is a flowchart for explaining a process of mode setting in the digital camera.

FIGS. 4A and 4B show display examples of a mode setting screen of the digital camera 100 of this embodiment. FIG. 4A is a display example when the human detection mode is set, and FIG. 4B is a display example when the human; animal detection mode is set. FIG. 5 is a flowchart for explaining a mode setting process in the digital camera 100.

In the digital camera 100 of this embodiment, for example, the human detection mode and the human/animal detection mode can be set as operation modes in which an object is automatically recognized for the focusing operation. In the examples of FIGS. 4A and 4B, the display monitor 130 displays an animal recognition key 60 on an autofocus mode setting screen. The animal recognition key 60 is a key for determining whether an animal is detected in the image recognition of the digital camera 100.

In the digital camera 100 of this embodiment, the controller 135 receives an operation of the animal recognition key 60 via the operation receiver 150 and performs a process shown in FIG. 5. When the animal recognition key 60 is turned off (NO at S1), the controller 135 sets the digital camera 100 to the human detection mode (S2). In FIG. 4A, a human detection icon 61 is displayed to indicate a state set to the human detection mode. In the human detection mode of this embodiment, the digital camera 100 detects body, a face, and an eye of a human. The operation in the human detection mode will be described later.

On the other hand, when, the animal recognition key 60 is turned on (YES at S1), the controller 135 sets the digital camera 100 to the human/animal detection mode (S3). In FIG. 4B, a human/animal detection icon 62 is displayed to indicate a state set to the human/animal detection mode. In the human/animal detection mode of this embodiment, the digital camera 100 detects parts of an animal in addition to the detection of parts of a human in the human detection mode. The operation in the human/animal detection mode will be described later.

As described above, the digital camera 100 of this embodiment has the human detection mode (an example of the first detection mode) and the human/animal detection mode (an example of the second detection mode) and does not have an animal detection mode (an example of the third detection mode) without detection of a human.

For example, when a camera having an animal detection mode is set to the animal detection mode, detection of a human cannot happen except erroneous detection in which a human is mistaken for an animal. In this case, when the erroneous detection occurs, it is difficult to prevent the user from noticing the erroneous detection. In contrast to this, the digital camera 100 of this embodiment does not have the animal detection mode, and an animal is detected in the operation mode that is the human/animal detection mode including detection of a human. Therefore, even if a human is erroneously detected and mistaken for an animal, the digital camera 100 can prevent the user from noticing the erroneous detection.

The digital camera 100 of this embodiment may have an operation mode in which the object is not automatically recognized, i.e., an operation mode in which neither a human nor an animal is detected. For example, the digital camera 100 may have various operation modes in which autofocus is achieved for a preset position on the captured image Im.

[1-2-2. Operation in Human Detection Mode]

The operation in the human detection mode of this embodiment will be described with reference to FIGS. 6 to 7.

Figure 6:
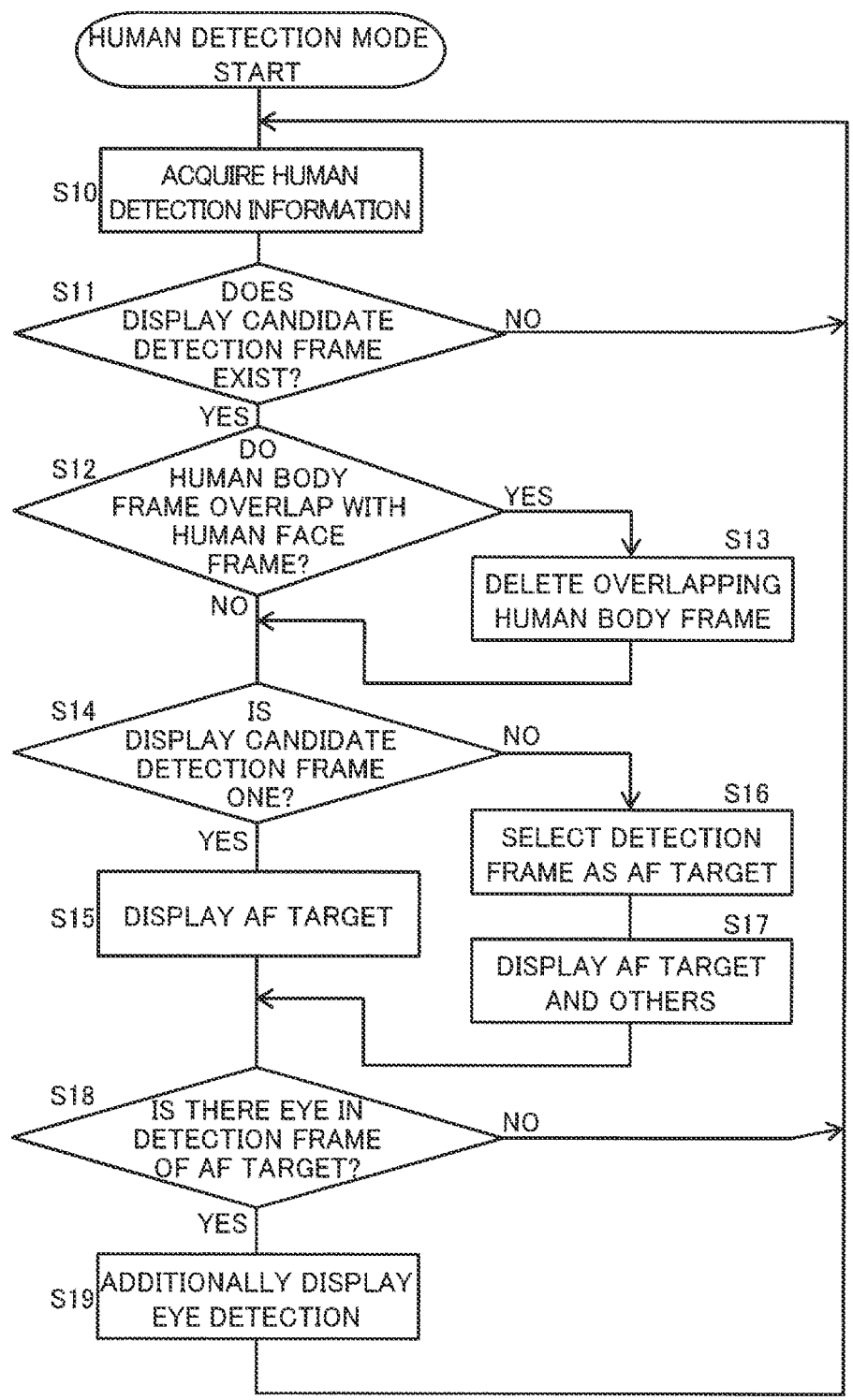
FIG. 6 is a flowchart illustrating an operation of the digital camera in a human detection mode.

FIG. 6 is a flowchart illustrating the operation of the digital camera 100 in the human detection mode. The flowchart of FIG. 6 is executed when the digital camera 100 is set to the human detection mode (see FIG. 4A). The processes in this flowchart are executed by the controller 135 of the digital camera 100.

At first, the controller 135 acquires the human detection information D1 from the image recognizer 122 (S10). The image recognizer 122 performs the image recognition process in a predetermined period such as a frame period of the captured image Im, to generate the human detection information D1. The image recognizer 122 may generate the animal detection information D2 at the same time.

Figure 7A:
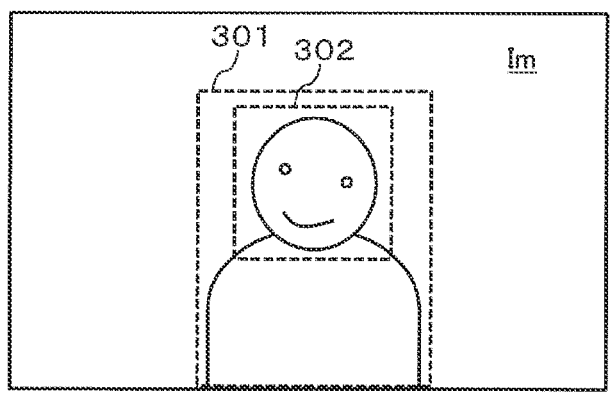
FIGS. 7A and 7B are diagrams for explaining the operation of the digital camera in the human detection mode.

The controller 135 determines presence/absence of a detection frame of a display candidate that is a candidate to be displayed on the display monitor 130 based on the acquired human detection information D1 (S11). In this embodiment, the human detection information D1 includes position information indicative of a region where a body, a face, and an eye of a human are detected. FIG. 7A shows an example of a display candidate detection frame.

In the example of FIG. 7A, a human body frame 301 surrounding a human body region and a human face frame 302 surrounding a human face region on the captured image Im are recognized as display candidates. The positions and sizes of the frames 301, 302 are respectively set in accordance with the acquired human detection information D1. The controller 135 recognizes the human body frame 301 and the human face frame 302 based on the acquired human detection information D1 and stores the frames as the display candidates in the buffer memory 125 or the like. The human body frame 301 and the human face frame 302 are examples of a first frame and a second frame, respectively, constituting the human detection frame 30.

When the human detection frame 30 is not recognized in the human detection information D1 from the image recognizes 122, the controller 135 determines that no display candidate detection frame exists (No at S11) and returns to step S10.

When a display candidate detection frame exists (YES at S11), the controller 135 determines whether the region surrounded by the recognized human face frame 302 and the region surrounded by the human body frame 301 overlap with each other (S12). For example, in the case of FIG. 7A, the human face frame 302 overlaps such that the frame is contained in the region inside the human body frame 301, and therefore, the controller 135 goes to "YES" at step S12.

When the region of the human face frame 302 and the region of the human body frame 301 overlap with each other (YES at S12), the controller 135 deletes the overlapping human body frame 301 from the display candidates (S13). In this case, the human body frame 301 is not displayed, so that the human face frame 302 is displayed in a prioritized manner (see FIG. 7B). On the other hand, when the region 12 of the human face frame 302 does not overlap with the region of the human body frame 301 (NO at S12), the controller 135 goes to step S14 without particularly performing the process of step S13.

The controller 135 then determines whether only one display candidate detection frame exists (S14). When only one display candidate detection frame exists (YES at S14), the controller 135 controls the display monitor 130 to display the detection frame in a displaying style of the AF target (S15). For example, the displaying style in this case is the same as the displaying style of the AF target detection frame 50 of FIG. 3B.

On the other hand, when multiple detection frames exist as display candidates (NO at S14), the controller 135 selects one detection frame as the AF target out of the multiple detection frames (S16). The selection at step S16 may be performed in accordance with a user operation, in a random manner, or in predetermined order of priority. The order of priority may be set such that the human face frame 302 is prioritized over the human body frame 301.

The controller 135 then displays the selected detection frame in the displaying style of the AF target and displays other detection frames in a displaying style different from the AF target (S17). An upper limit may be set as needed for the number of simultaneously displayed detection frames other than the AF target.

Figure 7B:
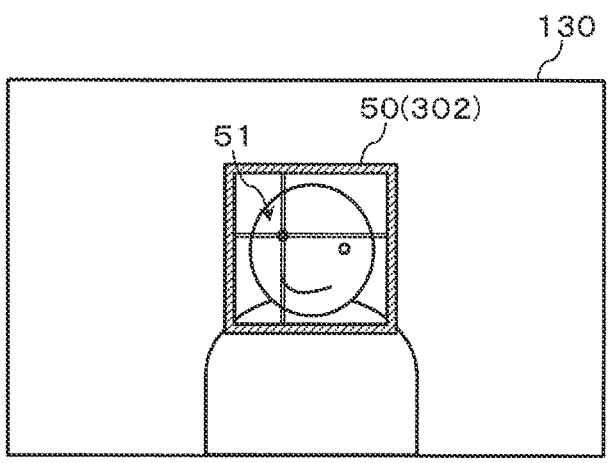

The controller 135 determines whether an eye is detected within the region of the AF target detection frame 50 based on the human detection information D1 acquired at step S10, for example (S18). When determining that an eye is detected (YES at S18), the controller 135 controls the display monitor 130 to additionally display information 51 indicative of a detection result of the eye in accordance with a position of the detected eye (S19). FIG. 7B illustrates a display example of step S19.

When determining that no eye is detected (NO at S18), the controller 135 returns to step S10 without particularly performing the additional display of step S19. The controller 135 periodically and repeatedly executes the processes of steps S10 to S19.

According to the operation in the human detection mode described above, a human is detected based on the human detection information D1 of the image recognizer 122, while an animal is not particularly detected. According to the human detection frame 30 displayed on the display monitor 130, the user can grasp the human recognized by the digital camera 100. Additionally, the digital camera 100 can use a contrast evaluation value or the like in the AF target detection frame 50 to perform the focusing operation for focusing on the main object, for example.

When a detection frame surrounding an animal is displayed in the human detection mode, this is considered as erroneous detection made by the digital camera 100 mistaking the animal as a human; however, such erroneous detection may be allowed to be visually recognized by the user. Even in this case, the determination is made in the human detection mode based only on whether an object can be detected as a human. Therefore, even if the reason why a human cannot be detected is the erroneous detection in which the human is mistaken for an animal, a situation allowing the user to recognize the reason can be avoided. This can reduce the possibility that a user feels uncomfortable due to the erroneous detection in which a human is mistaken for an animal.

[1-2-3. Operation in Human/Animal Detection Mode]

The operation in the human/animal detection mode of this embodiment will be described with reference to FIGS. 8 to 11.

Figure 8:
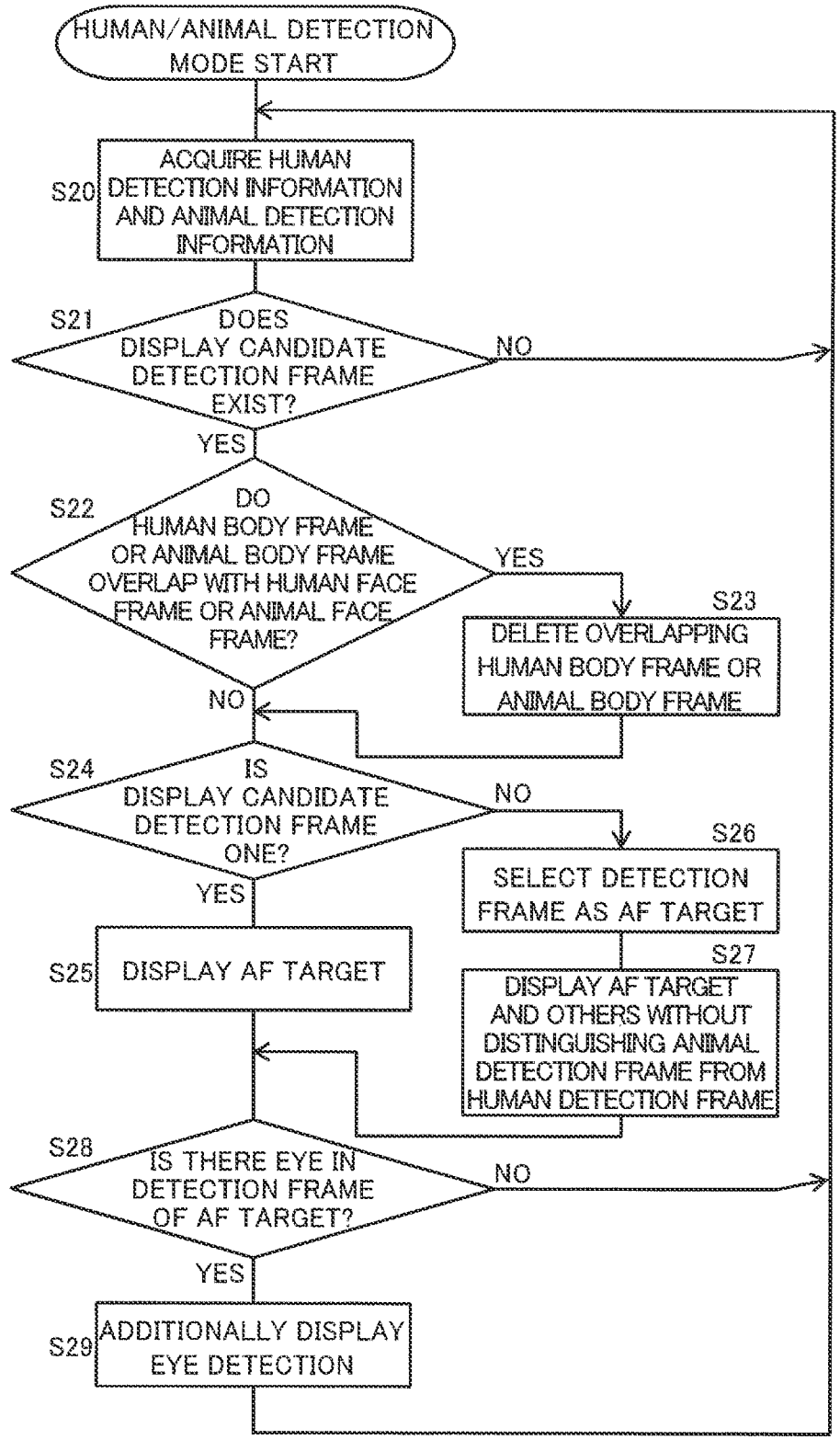
FIG. 8 is a flowchart illustrating an operation of the digital camera in a human/animal detection mode.

FIG. 8 is a flowchart illustrating the operation of the digital camera 100 in the human/animal detection mode. The flowchart of FIG. 8 is executed when the digital camera 100 is set to the human/animal detection mode (see FIG. 4B). The processes in this flowchart are executed by the controller 135 of the digital camera 100.

In the flowchart of FIG. 8, the controller 135 acquires, in addition to the human detection information D1 as in step S10 of FIG. 6, the animal detection information D2 from the image recognizer 122 (S20). Based on the acquired human detection information Dl and animal detection information D2, the controller 135 performs the processes of subsequent steps S21 to S29 such that the human detection frame 30 and the animal detection frame 40 are displayed without distinction, in a similar manner the processes of respective steps S11 to S19.

Figure 9A:
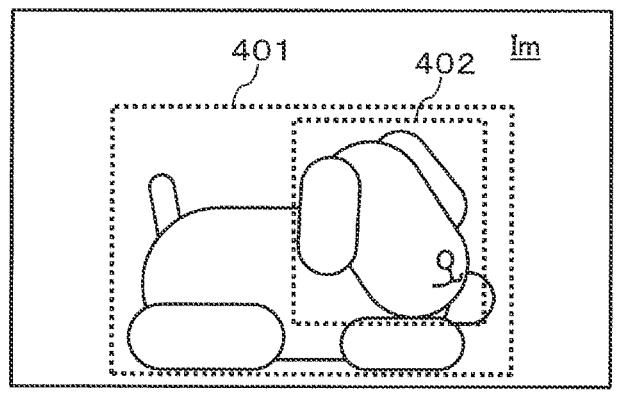
FIGS. 9A and 9B are diagrams for explaining an animal body frame and an animal face frame of the digital camera.
Figure 9B:
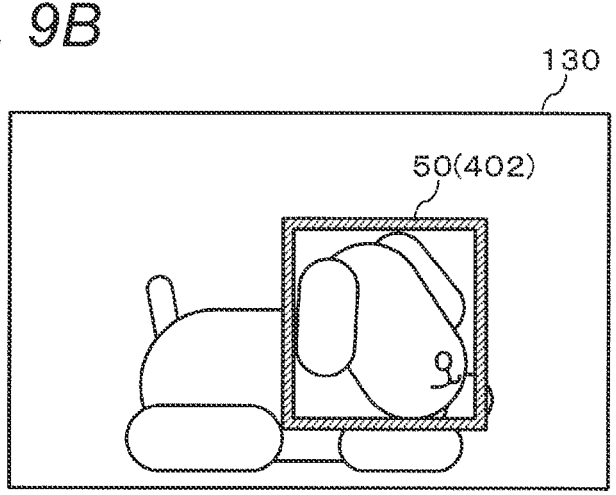

For example, as shown in FIG. 9A, the controller 135 recognizes, as display candidates, an animal body frame 401 surrounding an animal body region and an animal face frame 402 surrounding an animal face region detected on the captured image Im in accordance with the animal detection information D2 (S21), as in the case of the human body frame 301 and the human face frame 302 (see FIG. 7A). The animal body frame 401 and the animal face frame 402 are examples of a third frame and a fourth frame, respectively, constituting the animal detection frame 40.

When a display candidate detection frame exists (YES at S21), the controller 135 determines whether the region of the animal face frame 402 and the region of the animal body frame 401 overlap with each other (S22), for example in the same manner as the determination of overlap between the human face frame 302 and the human body frame 301 (see S12 of FIG. 6). When the region of the animal face frame 402 and the region of the animal body frame 401 overlap with each other (YES at S22), the controller 135 deletes the human body frame 301 overlapping with the animal face frame 402 from the display candidates (S23). As a result, the animal face frame 402 is displayed in a prioritized manner over the animal body frame 401 (see FIG. 9B).

At step S22, the controller 135 may determine an overlap between the animal face frame 402 and the human body frame 301 or may determine an overlap between the human face frame 302 and the animal body frame 401 in the same way as described above. When the region of the human face frame 302 or the animal face frame 402 overlaps with the region of the human body frame 301 or the animal body frame 401 (YES at S22), the controller 135 deletes the overlapping human body frame 301 or the animal body frame 401 (S23) so that the display of the human face frame 302 and the animal face frame 402 can be prioritized.

Similarly, when the display candidate detection frame is the one animal detection frame 40 (YES at S24), the controller 135 displays the AF target detection frame 50 in the same displaying style as in the case that the AF target is the human detection frame 30 (S25). On the other hand, when multiple detection frames exist as display candidates (NO at S24), the controller 135 selects one detection frame as the AF target out of the multiple detection frames (S26).

Figure 10:
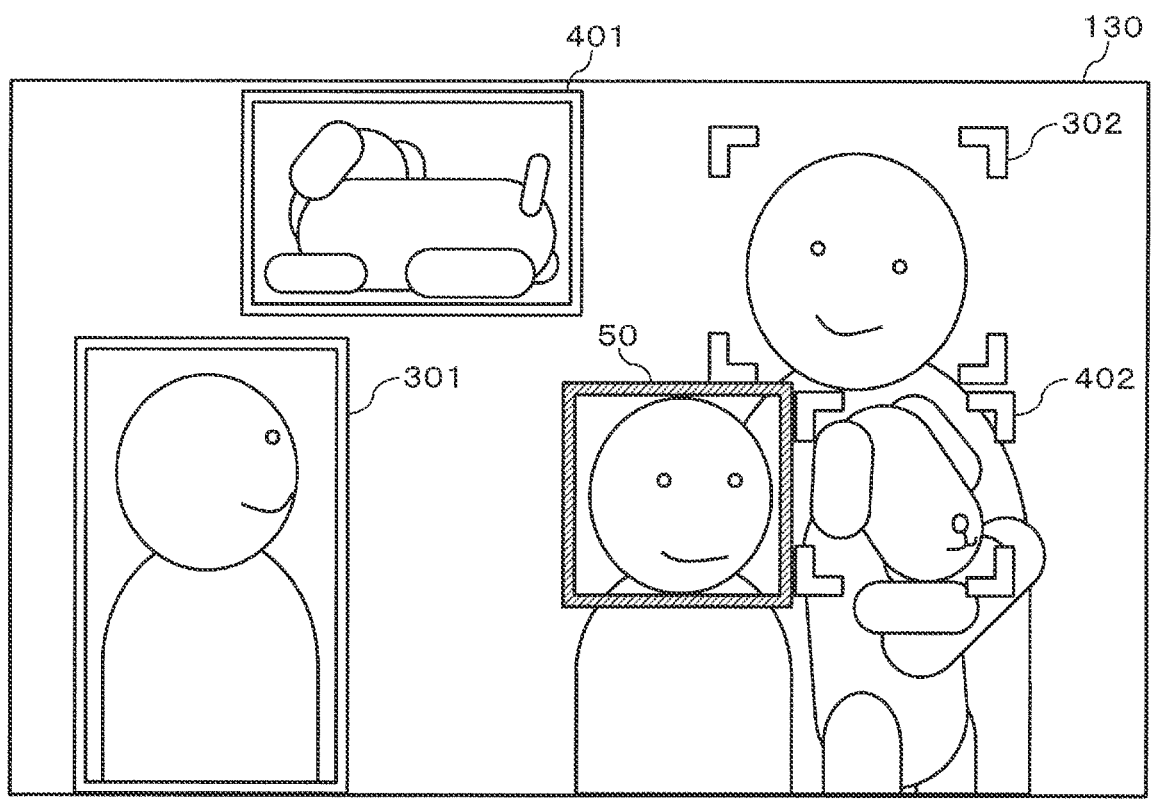
FIG. 10 is a diagram showing a display example of a human detection frame and an animal detection frame of the digital camera.

For example, after selecting the AF target detection frame from the display candidates (S26), the controller 135 then displays the detection frames 30, 40 in a displaying style in which the human detection frame 30 and the animal detection frame 40 other than the selected detection frame are not distinguished from each other (S27). FIG. 10 shows a display example when various types of the human detection frames 30 and the animal detection frames 40 are included.

As illustrated in FIG. 10, an animal body frame 401 and a human body frame 301 other than the AF target are displayed in the same displaying style. Additionally, an animal face frame 402 and a human face frame 302 other than the AF target are displayed in the same displaying style. For example, as shown in FIG. 10, the face frames 302, 402 may be displayed in different displaying styles such as different in frame shape or the like from the body frames 301, 401. The difference in the displaying style between the AF target detection frame 50 and the other detection frames 301 to 402 may be color or the like. For example, the AF target detection frame 50 may be in a chromatic color (e.g., yellow), while the other detection frames 301 to 402 may be in an achromatic color (e.g., white).

According to the processes described above, when a human and an animal are detected as objects in the human/animal detection mode, the human detection frame 30 and the animal detection frame 40 are displayed without distinction (S27). Therefore, a situation making the user uncomfortable due to erroneous detection of a human and an animal can easily be avoided.

For example, in the example of FIG. 10, the human face frame 302 and the animal face frame 402 other than the AF target are displayed in the same displaying style. Therefore, even if a human face is erroneously detected as an animal face, the displaying style does not change depending on the presence/absence of the erroneous detection, so that the erroneous detection can be prevented from being visually recognized by the user.

According to steps S22, S23 described above, in the exemplary case where the region of the human face frame 302 and the region of the animal body frame 401 overlap with each other (YES at S22), the controller 135 deletes the animal body frame 402 overlapping with the human face frame 302 from the display candidates (S23). Such an example is shown in FIGS. 11A and 11B.

Figure 11A:
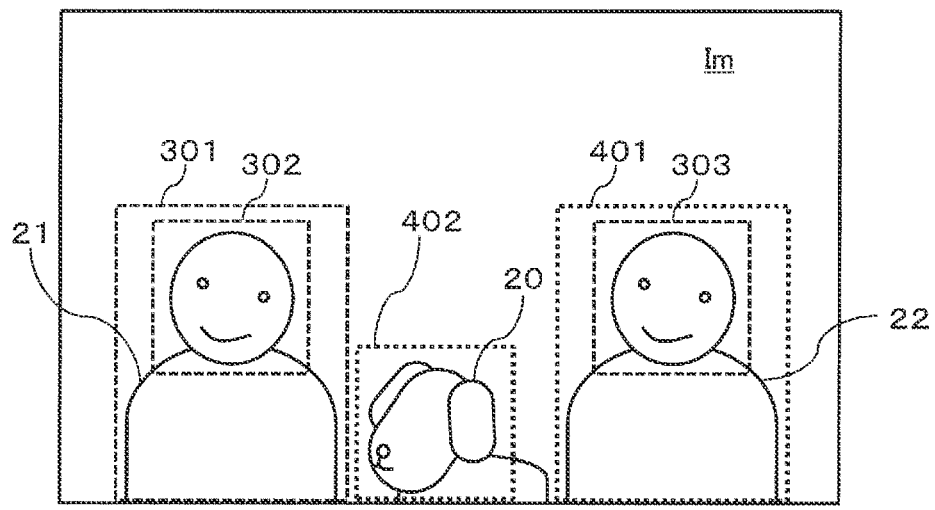
FIGS. 11A and 11B are diagrams for explaining prioritized display in the human/animal detection mode.
Figure 11B:
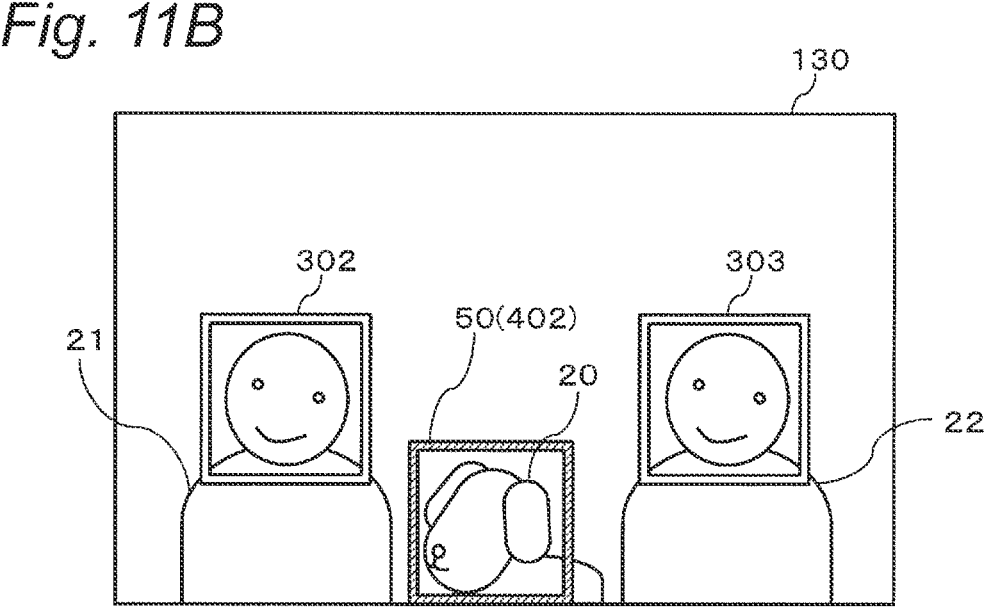

In the example of FIG. 11A, the face and body of the first person 21 and the face of the second person 22 are properly detected from the two persons 21, 22 among the objects; however, the body of the person 22 is erroneously detected as an animal. In this case, the controller 135 does not display the human body frame 301 overlapping with the human face frame 302 of the first person, does not display the animal body frame 401 overlapping with the human face frame 303 of the second person, and displays the face frames 302, 303 in a prioritized manner as shown in FIG. 11B (S22, S23). Therefore, the prioritized display of the person 22 partially erroneously detected as an animal is performed in the same way as the prioritized display of the normally detected person 21. Thus, this makes it easy to avoid a situation in which the user notices the erroneous detection from the behavior of the digital camera 100 related to the prioritized display of the human face frames 302, 303.

For example, even when the AF target main object is changed from the animal 20 to the person 22 by a user operation or the like, the displaying style of the AF target detection frame 50 is the same before and after the change (S27). In this case, even if the person 22 is erroneously detected as an animal, the displaying style of the AF target does not change, which makes it easy to avoid the uncomfortable feeling of the user noticing the erroneous detection.

[1-3. Effects and the Like]

As described above, in this embodiment, the digital camera 100 is an example of the imaging apparatus and includes the image sensor 115 (image sensor), the display monitor 130 (display), and the image recognizer 12 (first and second detectors, and the controller 135 (controller). The image sensor 115 captures an image of an object to generate the captured image Im. The display monitor 130 displays the captured image Im. When the object is a human, the image recognizer 122 serves as the first detector 122a to detect at least a portion of the human. When the object is an animal, the image recognizer 122 serves as the second detector 122b to detect at least a portion of the animal. The controller 135 controls the display monitor 130 to display the human detection frame 30 (first detection frame) corresponding to a human and the animal detection frame 40 (second detection frame) corresponding to an animal on the captured image Im. The controller 135 controls the display monitor 130 such that when neither the human detection frame 30 nor the animal detection frame 40 is the AF target detection frame 50 (third detection frame) corresponding to the main object among the objects, the frames 30, 40 are displayed in a common displaying style.

According to the digital camera 100 described above, the human detection frame 30 and the animal detection frame 40 other than the AF target detection frame 50 are displayed without distinction from each other (S27). This can reduce the possibility of making the user uncomfortable in the case of the erroneous detection in which a human is mistaken for an animal in the digital camera 100 detecting a human and an animal.

In this embodiment, the AF target detection frame 50 is displayed in a common displaying style between a case where the main object is a human and a case where the main object is an animal (S25, S27). As a result, even if the main object is erroneously detected and mistaken for an animal, the displaying style of the corresponding detection frame 50 does not change, so that the possibility of making the user uncomfortable can be reduced.

In this embodiment, the human detection frame 30 includes the human body frame 301 (first frame) indicative of a region surrounding a human body and the human face frame 302 (second frame) indicative of a region surrounding a human face on the captured image Im. When the region of the human body frame 301 and the region of the human face frame 302 overlap with each other (YES at S12), the controller 135 controls the display monitor 130 to display the human face frame 302 without displaying the human body frame 301 (S13). Therefore, the human face frame 302 can be displayed in a prioritized manner over the human body frame 301.

In this embodiment, the animal detection frame 40 includes the animal body frame 401 (third frame) indicative of a region surrounding an animal body on the captured image Im. When the region of the animal body frame 401 and the region of the human face frame 302 overlap with each other (YES at S22), the controller 135 controls the display monitor 130 to display the human face frame 302 without displaying the animal body frame 401 (S23). Therefore, even if a human body is erroneously detected as an animal body, the prioritized display of the human face frame 302 can be performed to reduce the possibility that the user notices the erroneous detection.

In this embodiment, the animal detection frame 40 further includes the animal face frame 402 (fourth frame) indicative of a region surrounding a region of an animal face on the captured image Im. The controller 135 causes the display monitor 130 to display the human body frame 301 and the animal body frame 401 without distinction from each other and to display the human face frame 302 and the animal face frame 402 without distinction from each other (S27, S25). As a result, the detection frames 301 to 402 are displayed in the same manner for the body and the face between the human and the animal, which can make it difficult for the user to notice the erroneous detection.

The first detector 122a of the image recognizer 122 of this embodiment may detect at least one of a body, a face, and an eye of a human. The second detector 122b of the image recognizer 122 of this embodiment may detect at least one of a body, a face, and an eye of an animal.

The controller 135 of this embodiment may control the focusing operation of the digital camera 100 so as to focus on the main object based on the AF target detection frame 50.

In this embodiment, the displaying style described above may include at least one of a color, a line type, a line width, and a frame shape of the detection frames 30, 40, 50. At least one of the color, the line type, the line width, and the frame shape may be common between the human detection frame 30 and the animal detection frame 40 other than the AF target detection frame 50.

In this embodiment, the digital camera 100 may further include the operation receiver 150 allowing setting an operation mode of the digital camera 100. The digital camera 100 has the human detection mode (first detection mode) for detecting a human without detecting an animal and the human/animal detection mode (second detection mode) for detecting a human and detecting an animal as the operation mode and does not have the animal detection mode (third detection mode) for detecting an animal without detecting a human. Accordingly, the camera cannot be set to the animal detection mode in which only an animal is supposed to be detected. Thus, this can reduce the possibility that the user feels uncomfortable due to the erroneous detection in which a human is mistaken for an animal.

Other Embodiments

As described above, the first embodiment has been described as exemplification of the techniques disclosed in this application. However, the techniques in the present disclosure are not limited thereto and are also applicable to embodiments in which modifications, replacements, additions, omissions, and the like are appropriately made. Additionally, the constituent elements described in the first embodiment can be combined to provide a new embodiment.

In the operation example described in the first embodiment, the animal face frame 402 based on the animal detection information D2 is a display candidate in the flowchart of FIG. 8. In this embodiment, the animal face frame 402 may not be a display candidate. For example, the display candidate of the animal detection frame 40 based on the animal detection information D2 may be only the animal body frame 401, while the display candidate human detection frame 30 based on the human detection information D1 may be the human body frame 301 and the human face frame 302. Even in this case, when the detection frames 30, 40 are displayed, the human detection frame 30 and the animal detection frame 40 are displayed without distinction. Therefore, as in the first embodiment, this can reduce the possibility of making the user uncomfortable.

In the case described above, the animal face frame 402 may be used for various internal operations of the digital camera 100 other than the display candidates. For example, when the animal body frame 401 is displayed as the AF target detection frame 50 with the animal face frame 402 overlapping with the animal body frame 401, the controller 135 may perform a focusing operation based on the animal face frame 402.

In the above embodiments, the image recognizer 122 detects a body, a face, and an eye for both a human and an animal. In this embodiment, a human part to be detected may be different from an animal part to be detected. For example, an animal face may not be detected, or an animal eye may not be detected, in the image recognizer 122.

In the above embodiments, the digital camera 100 including the image recognizer 122 has been described. In this embodiment, the image recognizer 122 may be provided in an external server. In this case, the digital camera 100 may transmit the image data of the captured image via the communication module 155 to the external server and may receive, from the external server, the human detection information D1 and the animal detection information D2 as the processing result of the image recognizer 122. In the digital camera 100 as described above, the communication module 155 functions as the first and second detectors.

In the examples described in the above embodiments, the first and second detectors are integrally configured; however, the first and second detectors may separately be configured as needed.

In the above embodiments, the AF target detection frame 50 has been described as an example of the third detection frame corresponding to the main object. In this embodiment, the third detection frame may not be the AF target and may be applied to various uses (e.g., exposure control) in the digital camera 100 other than the focusing operation.

In the above embodiments, the digital camera 100 including the optical system 110 and the lens driver 112 has been described as an example. The imaging apparatus of this embodiment may not include the optical system 110 and the lens driver 112, and may be an interchangeable lens type camera, for example.

In the above embodiments, the digital camera has been described as an example of the imaging apparatus; however, the present disclosure is not limited thereto. The imaging apparatus of the present: disclosure may be any electronic device having an image capturing function (e.g., a video camera, a smartphone, a tablet terminal).

The embodiments have been described as exemplification of the techniques in the present disclosure. The accompanying drawings and the detailed description have been provided for this purpose.

Therefore, the constituent elements described in the accompanying drawings and the detailed description may include not only the constituent elements essential for solving the problem but also constituent elements not essential for solving the problem so as to illustrate the techniques. Thus, even though these non-essential constituent elements are included in the accompanying drawings and the detailed description, these non-essential constituent elements should not immediately be recognized as being essential.

Since the embodiments described above are intended to illustrate the techniques in the present disclosure, various modifications, replacements, additions, omissions, and the like can be made within the claims and the scope equivalent thereto.

INDUSTRIAL APPLICABILITY

The present disclosure is applicable to an imaging apparatus having a function of detecting a human and an animal.

The invention claimed is:
1. An imaging apparatus comprising:
an image sensor that captures an image of an object to generate a captured image;
a display that displays the captured image;
a first detector that detects whether the object includes at least a portion of a human by image recognition processing;
a second detector that detects whether the object includes at least a portion of an animal by image recognition processing; and
a controller that controls the display to display a first detection frame and a second detection frame on the captured image, the first detection frame corresponding to the human and the second detection frame corresponding to the animal, wherein
the controller controls the display to display the first and second detection frames in a common displaying style with displaying a third detection frame when neither the first detection frame nor the second detection frame is the third detection frame, the third detection frame being displayed in a displaying style different than the common displaying style and corresponding to a main object of the objects, the main object being an object from among the objects representing at least one of an autofocus target or target for exposure control.

2. The imaging apparatus according to claim 1, wherein the third detection frame is displayed in a common displaying style between a case where the main object is the human and a case where the main object is the animal.

3. The imaging apparatus according to claim 1, wherein the first detection frame includes a first frame indicative of a region surrounding a body of the human and a second frame indicative of a region surrounding a face of the human on the captured image, and wherein when the region of the first frame and the region of the second frame overlap with each other, the controller controls the display to display the second frame without displaying the first frame.

4. The imaging apparatus according to claim 3, wherein the second detection frame includes a third frame indicative of a region surrounding a body of the animal on the captured image, and wherein when the region of the third frame and the region of the second frame overlap with each other, the controller controls the display to display the second frame without displaying the third frame.

5. The imaging apparatus according to claim 4, wherein the second detection frame includes a fourth frame indicative of a region surrounding a face of the animal on the captured image, and wherein the controller causes the display to display the first frame and the third frame without distinction from each other and to display the second frame and the fourth frame without distinction from each other.

6. The imaging apparatus according to claim 1, wherein the first detector detects at least one of a body, a face, and an eye of the human, and wherein the second detector detects at least one of a body, a face, and an eye of the animal.

7. The imaging apparatus according to claim 1, wherein the controller controls a focusing operation of the imaging apparatus to focus on the main object based on the third detection frame.

8. The imaging apparatus according to claim 1, wherein the displaying style includes at least one of a color, a line type, a line width, and a frame shape of the detection frames.

9. The imaging apparatus according to claim 1, further comprising an operation receiver allowing setting an operation mode of the imaging apparatus, wherein the imaging apparatus has a first detection mode and a second detection mode, the first detection mode detecting the human without detecting the animal, and the second detection mode detecting the human and detecting the animal, but does not have a third detection mode detecting the animal without detecting the human.

10. The imaging apparatus according to claim 1, wherein the first detection frame includes a first frame indicating a region surrounding a body of the human on the captured image, the second detection frame includes a second frame indicating a region surrounding a body of the animal on the captured image, and the controller controls the display to display the first frame and the second frame together with the third detection frame in a common display style which differs from a display style of the third detection frame when neither the first frame nor the second frame is the third detection frame corresponding to the main object among the objects.

11. The imaging apparatus according to claim 1, wherein the first detection frame includes a first frame indicating a region surrounding a face of the human on the captured image, the second detection frame includes a second frame indicating a region surrounding the face of the animal on the captured image, the controller controls the display to display the first frame and the second frame together with the third detection frame in a common display style which differs from a display style of the third detection frame when neither the first frame nor the second frame is the third detection frame corresponding to the main object among the objects.

12. An imaging apparatus comprising:

an image sensor that captures an image of an object to generate a captured image;

a display that displays the captured image;

a first detector that detects whether the object includes at least a portion of a human by image recognition processing;

a second detector that detects whether the object includes at least a portion of an animal by image recognition processing; and a controller that controls the display to display a first detection frame and a second detection frame on the captured image, the first detection frame corresponding to the human and the second detection frame corresponding to the animal, wherein the controller controls the display to display the first and second detection frames in a common displaying style when neither the first detection frame nor the second detection frame is a third detection frame corresponding to a main object of the objects, wherein the first detection frame includes a first frame indicative of a region surrounding a body of the human and a second frame indicative of a region surrounding a face of the human on the captured image, and wherein when the region of the first frame and the region of the second frame overlap with each other, the controller controls the display to display the second frame without displaying the first frame.

13. The imaging apparatus according to claim 12, wherein the second detection frame includes a third frame indicative of a region surrounding a body of the animal on the captured image, and wherein when the region of the third frame and the region of the second frame overlap with each other, the controller controls the display to display the second frame without displaying the third frame.

14. The imaging apparatus according to claim 13, wherein the second detection frame includes a fourth frame indicative of a region surrounding a face of the animal on the captured image, and wherein the controller causes the display to display the first frame and the third frame without distinction from each other and to display the second frame and the fourth frame without distinction from each other.

* * * * *